United States Patent [19]

Saito et al.

[11] 4,066,718
[45] Jan. 3, 1978

[54] PROCESS FOR THE PRODUCTION OF ETHYLENE-PROPYLENE BLOCK COPOLYMERS

[75] Inventors: Shinichi Saito, Ichihara; Asaya Okaue, Kimitsu; Kazuo Baba; Shigeo Tanaka, both of Ichihara, all of Japan

[73] Assignee: Sumitomo Chemical Company, Limited, Osaka, Japan

[21] Appl. No.: 730,742

[22] Filed: Oct. 8, 1976

[30] Foreign Application Priority Data

Oct. 13, 1975 Japan .................................. 50-123411

[51] Int. Cl.$^2$ ............................................. C08F 297/08
[52] U.S. Cl. .................................................. 260/878 B
[58] Field of Search ...................................... 260/878 B

[56] References Cited

U.S. PATENT DOCUMENTS

| | | | |
|---|---|---|---|
| 3,378,607 | 4/1968 | Jones et al. | 260/878 B |
| 3,401,212 | 9/1968 | Griffin | 260/878 B |
| 3,514,501 | 5/1970 | Leibson et al. | 260/878 B |
| 3,525,781 | 8/1970 | Scoggin | 260/878 B |
| 3,629,368 | 12/1971 | Fukuda et al. | 260/878 B |

*Primary Examiner*—Alan Holler

*Attorney, Agent, or Firm*—Birch, Stewart, Kolasch & Birch

[57] ABSTRACT

A method for the continuous production of crystalline ethylene-propylene block copolymers containing propylene as the major component and having excellent physical properties as that by a batch process in a slurry-phase by homopolymerizing propylene and then copolymerizing ethylene and propylene in the presence of an inert hydrocarbon solvent and a stereoregular polymerization catalyst in polymerization vessels connected in series, which is characterized by homopolymerizing propylene in three polymerization vessels, wherein the inner pressure of the vessels is decreased in order so as to make the inner-pressure difference between each consecutive two vessels from 1 to 3 kg/cm$^2$, and then copolymerizing ethylene and propylene in at least two polymerization vessels, the resulting slurry being transferred from one vessel to the next vessel by the inner-pressure difference between the vessels without using a transferring pump in the homopolymerization step and being pressure-transferred to at least one vessel by using a transferring pump for raising the pressure in the copolymerization step.

5 Claims, 1 Drawing Figure

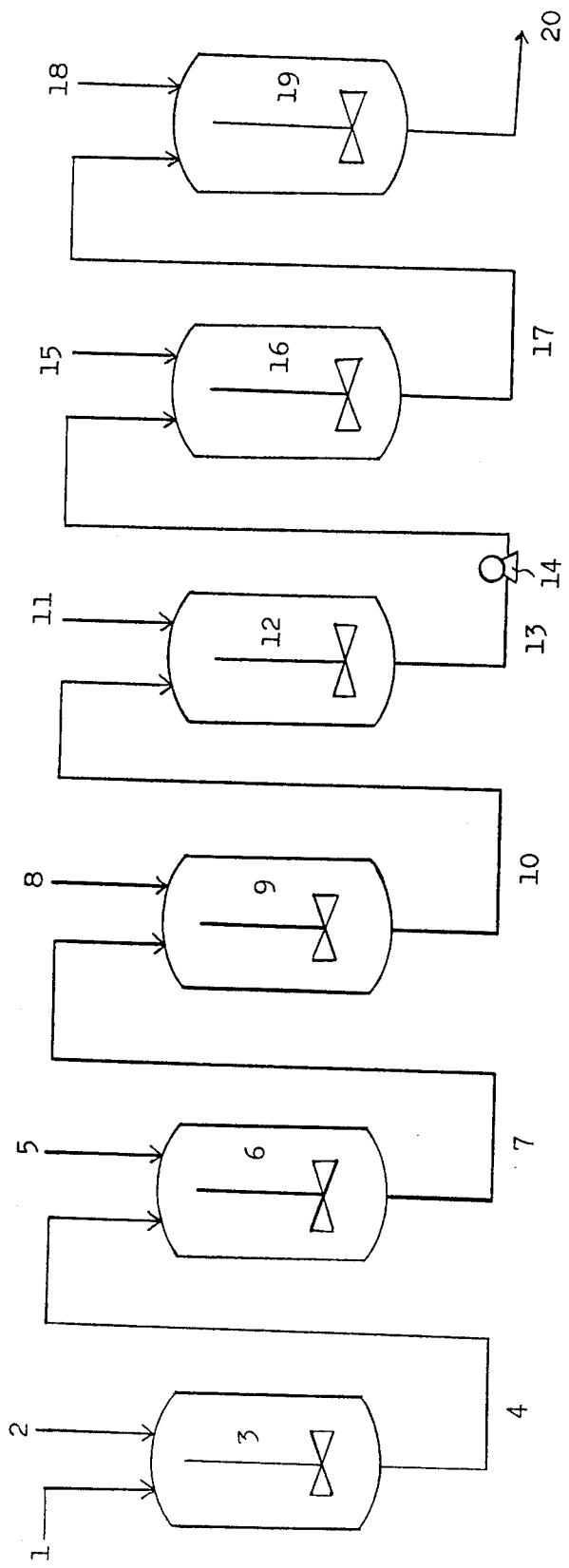

PROCESS FOR THE PRODUCTION OF ETHYLENE-PROPYLENE BLOCK COPOLYMERS

BACKGROUND AND SUMMARY OF THE INVENTION

The present invention relates to a method for the continuous production of crystalline ethylene-propylene copolymers containing propylene as the major component which have improved physical properties.

Crystalline homopolypropylene resins are superior in stiffness at a high temperature and applicable up to 100° C but are inferior in impact strength and their applications at a low temperature have been limited. Various investigations have been made to improve the impact strength of the copolymers. Among them, a block copolymerization process disclosed for example in Japanese Patent Publication No. 1,836/1964 is a superior method for obtaining the polymers having a high impact strength as well as a high stiffness which is usually exhibited by homopolypropylene, said method comprising homopolymerizing propylene at the first stage and copolymerizing ethylene and propylene at the second stage.

Since the continuous process is considered as industrially more advantageous in terms of operation than a batch process, such ethylene-propylene block copolymers are usually produced by a continuous process which comprises connecting two stirred polymerization vessels in series and carrying out homopolymerization of propylene in one vessel followed by copolymerization of ethylene and propylene in the other vessel.

By the conventional continuous process, however, the impact strength is not sufficiently improved as compared withh that by the batch process. Furthermore, the continuous process has the disadvantage that the resulting block copolymers contain a larger proportion of polymer components which are soluble in the polymerization solvent, and hence the yield of the product is very low.

In order to improve the two-stage polymerization process, a three-stage polymerization process was proposed in Japanese Patent Publication Nos. 20,621/1969 and 26,190/1972. According to this process using three vessels connected in series, however, there can not be obtained a polymer having so high impact strength as that in the batch process.

When the number of polymerization vessel is increased in the multi-vessel continuous polymerization process, the retention time distribution of catalyst particles comes close to that in the batch process. On the basis of this idea, a multi-vessel continuous method for the production of ethylene-propylene block copolymers having improved physical properties is proposed in Japanese Patent Publication No. 12,589/1974 and Japanese Patent Publication (unexamined) No. 53,990/1974. In this process, however, there are required an extra vessel for purging propylene or slurry pumps for transferring the slurry from one homopolymerization vessel to another successively. Consequently, the polymerization equipment becomes unnecessarily complicated and the safe operation thereof is more difficult.

For the reasons described above, the present inventors have extensively studied to find an improved method for producing crystalline ethylene-propylene block copolymers containing propylene as the major component by the multi-vessel continuous polymerization. As the result, it has now been found that crystalline ethylene-propylene block copolymers having excellent physical properties as those in the batch process can be obtained by carrying out the homopolymerization of propylene in three vessels connected in series wherein the resulting slurry is transferred by the specified inner-pressure difference without using any transferring pump (hereinafter, referred to simply as "inner-pressure transfer", and carrying out the copolymerization of ethylene and propylene in at least two vessels in series wherein the transfer of the resulting slurry to at least one copolymerization vessel is carried out under a pressure using a transferring pump, especially a slurry pump (hereinafter, referred to simply as "pressure-transfer").

An object of the present invention is to provide a method for the production of crystalline ethylene-propylene block copolymers by a simplified multi-vessel continuous polymerization process.

Another object of the present invention is to provide a continuous method for the production of crystalline ethylene-propylene block copolymers having excellent physical properties close to those obtained by the batch process. These and other objects and advantages of the invention will be apparent from the following description.

The present invention provides an improved method for the continuous production of crystalline ethylene-propylene block copolymers containing propylene as the major component which is in the state of slurry in a hydrocarbon solvent by using polymerization vessels connected in series, which is characterized by homopolymerizing propylene in three polymerization vessels, wherein the inner pressure of the vessels is decreased in order so as to make the inner-pressure difference between each consecutive two vessels from 1 to 3 kg/cm$^2$, and then copolymerizing ethylene and propylene in at least two polymerization vessels, the resulting slurry being transferred from one vessel to the next vessel by the inner pressure difference between the vessels in the homopolymerization step and being pressure-transferred to at least one vessel in the copolymerization step. According to the method of the present invention, there are obtained crystalline ethylene-propylene block copolymers which have the same degree of physical properties as those of the products by the batch process. The ethylene content of the block copolymer is preferably 3 to 15% by weight.

In the present invention, more than five conventional stirred vessels connected in series are used as the polymerization vessels. The size of each vessel may be changeable depending upon the amount of the reactors in each reaction, but a uniform size of vessels may be used through whole polymerization system. Particularly, when multi-purpose use of the polymerization vessel is taken into account, the vessels of uniform size are more advantageously used.

The polymerization is carried out in a slurry state wherein the resulting polymers are suspended in an inert hydrocarbon solvent such as hexane, heptane, methylcyclohexane, toluene or the like. As the catalyst, there are used the so-called stereoregular polymerization catalysts which are conventionally used for the production of isotactic polypropylene. The commonly used catalysts are the combination of titanium trichloride as a main catalyst and an organoaluminum compound as an activator. Alternatively, a third component such as an electron donor may further be added as a promotor to the combination.

The titanium trichloride is prepared, for example, by reduction of titanium tetrachloride with aluminum followed by grinding in some cases. The organo-aluminum compound has preferably the following formula: $AlR_nX_{3-n}$ wherein R is an alkyl having 1 to 4 carbon atoms, X is a halogen and $n$ is 2 or 3. Suitable examples of the organoaluminum compounds are triethylaluminum, tri-iso-butylaluminum, diethylaluminum chloride and diethylaluminum bromide, etc, among which diethyl aluminum chloride is particularly preferred. The molar ratio of the organo-aluminum compound to titanium trichloride is generally 0.1 to 30.

Particularly, it is desirable to add titanium trichloride as a main catalyst to the first polymerization vessel alone. Hydrogen is preferably used for controlling the molecular weight and polymerization temperatures between 40° and 80° C are preferable in terms of the balance between the activity of polymerization reaction and the stereoregularity of the resulting polymers. The homopolymerization of propylene is carried out in the three vessels in series. The pressure in the first vessel is preferably 5.5 to 11.5 kg/cm² (gauge) and the pressure in the third vessel is preferably more than 2 kg/cm² (gauge). Transfer of the slurry between two consecutive homopolymerization vessels is carried out by the inner-pressure difference between the vessels. It is important to keep the inner-pressure difference between the two consecutive vessels at 1 to 3 kg/cm², preferably 1.5 to 2.5 kg/cm². When the difference is lower than 1 kg/cm², piping is blocked with the polymers and transfer of the slurry is not satisfactorily carried out. On the other hand, the difference of more than 3 kg/cm² is not desirable, because the difference in polymerization amount between the vessels becomes large, and moreover physical properties of the resulting polymers are largely lowered.

The transfer of slurry between the homopolymerization vessels may be carried out by the pressure-transfer, for instance, by means of a slurry pump. In this case, however, the throttled portions of piping are easily blocked with the polymer particles because the viscosity of the resulting homopolymerization slurry is so low that the polymer particles in the slurry are easily deposited. Furthermore, the polymer particles easily melt in the pump by friction among them.

Further, in consequence of the pressure-transfer of slurry, the pressure is to high even at the last homopolymerization vessel. Therefore, the amount of propylene sent to the first copolymerization vessel becomes large and, as the results, the load applied to the first copolymerization vessel becomes excessively large which causes losing the balance in the amount of the polymerization in each of these vessels. In order to avoid these defects, it is necessary to set up a vessel for removing propylene (purging vessel) and to pass the slurry therethrough before the slurry is sent to the first copolymerization vessel. Consequently, the equipment becomes further complicated.

In the present invention, the pressure in the homopolymerization vessels is decreased in order from the first vessel towards the last vessel. Consequently, an excessively large load to the first copolymerization vessel can be avoided without using a purging vessel, and then the copolymerization can well be carried out.

It may also be possible to transfer the slurry between the homopolymerization through a pipe connecting them by utilizing the difference of static head between the vessels. In this case, however, the polymer particles are easily deposited on the pipe and the particles tend to stay in the homopolymerization vessels. Therefore, this method is not used practically.

When the number of homopolymerization vessels is 2 or less, the physical properties of the resulting polymers are not improved to the same level as in the batch process. On the other hand, even if the number of vessels increases to 4 or more, the physical properties are not so much improved as compared with the case of three vessels and nevertheless the equipment becomes costly and complicated. Consequently, three vessels are sufficient for the homopolymerization.

The transfer of slurry from the homopolymeriztion vessel to the copolymerization vessel is carried out by an inner-pressure transferring process or a pressure transferring process. In the latter case, use of a slurry pump is advantageous in that pressure-increase by ethylene in the copolymerization vessel can easily be achieved. However, the former process is desirable, like the transfer of slurry between the homopolymerization vessels, in terms of simplicity and freedom from operational troubles.

Copolymerization of ethylene and propylene is carried out at and after the fourth vessel. The number of vessels used for the copolymerization is 2 or more, preferably 2 or 3. The transfer of slurry between the copolymerization vessels is relatively easy because the slurry has so much a high viscosity that the polymer particles are not easily deposited. The transfer can easily be carried out by the inner-pressure transferring process or pressure transferring process using a slurry pump. It is important that the transfer to at least one vessel should be carried out by the pressure transferring process.

The transfer of slurry may be carried out throughout whole polymerization steps by the difference of inner pressures between vessels, that is, by the pressure-decreasing system. In this case, however, the ethylene content of the resulting copolymers does not reach the required level and therefore the objective polymers having the required physical properties can not be obtained.

When the slurry is pressure-transferred, it is desirable to keep the pressure difference between vessels (the pressure in the back vessel minus the pressure in the front vessel) at −0.5 to 5 kg/cm², depending upon the ethylene content of the objective block copolymers. In this case, the pressure in the back vessel is sometimes lower than that in the front vessel owing to the pressure drop in the pipe connecting the both vessels.

The polymers produced by the foregoing method are purified by the usual after-treatment comprising decomposition of catalyst, washing and removal of soluble portions by extraction and separation.

The polymers obtained by the present invention have excellent stiffness and impact strength, and surprisingly, these properties are the same as those of the polymers obtained by the batch process. Although it may be suggested that the physical properties will be improved by the multi-vessel continuous polymerization process, it it surprising that, while properties are very much poorer in the conventional process using two vessels connected in series than in the batch process, they can be elevated, at a stroke, to the level in the batch process by the pressure-decreasing process of the present invention wherein only five vessels (in minimum) are used in total and the polymerization amount of propylene in the homopolymerization part is not necessarily uniform form vessel to vessel.

The present invention has the advantages as described above and further the process is very simple as follows:

1. In the homopolymerization step, the slurry is transferred to the next vessel through a connecting pipe according to the pressure-decreasing system (by the difference of inner pressures between the homopolymerization vessels) and therefore the transfer can be done without any trouble.

2. It is not required to set up a vessel for purging propylene and an equipment for circulating the purged propylene.

3. There is only a slurry transferring pipe but not a pressure balancing pipe between the vessels and therefore the vessels are independently separable from one another by stopping a slurry discharging valve in the case of emergency.

These characteristics are particularly important in the industrial production of the polymers.

The term "continuous" referred to herein means that the polymerization is continuously carried out. Even though the transfer of slurry between the vessels is carried out intermittently, the term "continuous" is used so far as the polymerization is continuously carried out in the vessels.

Embodiments of the present invention will be illustrated with reference to the accompanying drawing, which is not however to be interpreted as limiting the invention thereto.

The drawing shows a schematic flow sheet of the continuous polymerization process using six vessels in series. The first vessel 3, second one 6 and third one 9 make up the homopolymerization part of the process, and the fourth one 12, fifth one 16 and sixth one 19 make up the copolymerization (ethylene and propylene) part of the process. Catalysts such as titanium trichloride and diethylaluminum chloride and a solvent such as heptane are fed through a line 1 to the first vessel 3. Propylene and hydrogen (a molecular weight regulating agent) are fed through a line 2. These substances may be fed through separate lines and the feeding method is not particularly limited.

The propylene-polymer slurry obtained in the first vessel 3 is fed to the second vessel 6 through a line 4. Propylene, hydrogen and a solvent such as heptane are fed to the vessel 6 through a line 5. These substances may of course be fed through separate lines. The slurry in the vessel 6 is discharged through a line 7. The procedures are done in the same way with respect to the third vessel 9 and other vessels 12, 16 and 19, and propylene, hydrogen, solvent and ethylene are fed through lines 8, 11, 15 and 18 (the line 8 is not for feeding ethylene). Further, lines 10, 13, 17 and 20 are a slurry transferring line and 14 is a slurry pump by which the slurry is pressure-transferred to the fifth vessel 16. In this case, the inner pressure in the fifth vessel is not always higher than that in the fourth one owing to the pressure drop in the transferring pipe.

The slurry in the vessel is discharaged at the bottom thereof so as to keep the same level and fed to the next vessel at the top thereof. It is preferable that the discharge of slurry is intermittently done in the part wherein propylene is homopolymerized and is continuously done in the part wherein ethylene and propylene are copolymerized, but it is not particularly limited.

The polymer slurry discharged from the sixth vessel 19 through a line 20 is after-treated as usual. In this way, crystalline ethylene-propylene polymers having excellent physical properties are obtained.

The present invention will be illustrated by the following examples, but is not limited thereto.

Examples 1 to 2 and Reference Examples 1 to 4

Six 200-liter stainless steel vessels equipped with a stirrer were connected in series as shown in the drawing. Polymerization was continuously carried out under the conditions shown in Table 1 using commercially available heptane (b.p. 95°-109° C) as a solvent and a combined catalyst of titanium trichloride (produced by reduction of titanium tetrachloride with aluminum) and diethylaluminum chloride (DEAC).

The resulting polymer slurry was sent to the after-treatment process and n-butanol was added thereto so that the concentration thereof in heptane became 2% by weight. The mixture was stirred at 60° C for 2 hours, followed by centrifugation. After removing the solvent and alcohol remaining in the polymer by steam stripping, the polymer was re-centrifuged and vacuum-dried at 70° C for 10 hours to obtain white powdery, crystalline polymer.

The polymer was mixed with 2,6-di-tert-butyl-P-cresol (0.2 PHR), thiodilauryl dipropionate (0.2 PHR) and calcium stearate (0.2 PHR). The mixture was extruded and pressed at 220° C into sheet. The sheet was used as a test piece for measuring mechanical properties. Falling weight impact strength was measured on an injection molded sheet of 1 mm in thickness.

Example 1 was carried out according to the method of the present invention. The homopolymerization of propylene (hereinafter, referred to simply as homopolymerization) was carried out in the first to third vessels and the copolymerization of ethylene and propylene (hereinafter, referred to simply as copolymerization) was carried out in the fourth to sixth vessels.

Example 2 was also carried out according to the method of the present invention and, in this case, the homopolymerization and the copolymerization were carried out in the first to third vessels and in the fourth to fifth vessels, respectively, and the resulting polymer slurry was transferred directly from the fifth vessel to the after-treatment process.

Reference Example 1 was carried out according to the conventional two-vessel continuous polymerization process, wherein the homopolymerization and copolymerization were carried out in the first and second vessels, respectively and the resulting polymer slurry was transferred from the second vessel to the after-treatment process.

Reference Example 2 was carried out according to the 4-vessel continuous polymerization process, wherein the homopolymerization and copolymerization were carried out in the first to second vessels and in the third to fourth vessels, respectively, and the resulting polymer slurry was transferred from the fourth vessel to the after-treatment process. In this Reference Example, the slurry was transferred by the inner pressure tranferring process according to the pressure-decreasing system.

Reference Example 3 was carried out according to the 6-vessel continuous polymerization process, wherein the homopolymerization and copolymerization were carried out, like Example 1, in the first to third vessels and in the fourth to sixth vessels, respectively.

However, the transfer of slurry to the copolymerization vessel was carried out by the inner pressure transferring process without using a slurry pump.

Reference Example 4 was carried out according to the 5-vessel continuous polymerization process, like Example 2, but the difference in inner pressure between the hompolymerization vessels was more than 3 kg/cm². The polymerization conditions and polymer yields of Examples 1 to 2 and Reference Examples 1 to 4 are shown in Table 1 and the test results of the physical properties are shown in Table 2.

Reference Example 5

The polymerization was carried out using the first vessel alone according to the batch process. To the vessel were added 100 liters of heptane, 100 g of diethylaluminum chloride and 20 g of titanium trichloride AA and the inner pressure of the vessel was elevated with propylene and hydrogen while maintaining the temperature of liquid phase at 60° C. Feed of hydrogen was controlled so that the hydrogen content of the gaseous phase was kept at 2.5%. After the pressure in the autoclave reached 5 kg/cm²(gauge), the polymerization was carried out for 8 hours under the same condition.

Thereafter, the temperature of liquid phase was lowered to 52° C and the pressure in the autoclave was released. Next, ethylene and propylene were fed in the autoclave and the copolymerization was carried out for 4 hours during which the inner pressure was kept at 2 kg/cm²(gauge) and the ethylene content in the gaseous phase was kept at 20%. The after-treatment was carried out in the same manner as in the foregoing continuous polymerization examples. Thus, the polymer of 27.5 kg was obtained. The test results of the physical properties of the product are shown in Table 2.

Table 1

| | | | | Example | | Reference Example | | | |
|---|---|---|---|---|---|---|---|---|---|
| | | | | 1 | 2 | 1 | 2 | 3 | 4 |
| First vessel | Titanium trichloride | (feed) | g/H | 11.4 | 11.1 | 5.0 | 6.9 | 4.9 | 13.5 |
| | DEAC | (feed) | g/H | 57.0 | 55.5 | 25.0 | 34.5 | 24.5 | 67.5 |
| | Propylene | (feed) | kg/H | 12.8 | 12.6 | 7.0 | 11.9 | 10.7 | 17.4 |
| | Ethylene | (feed) | kg/H | — | — | — | — | — | — |
| | Heptane | (feed) | kg/H | 14.7 | 14.7 | 9.0 | 10.7 | 8.0 | 19.3 |
| | Polymerization pressure | | kg/cm²G | 8.5 | 8.5 | 5.0 | 8.0 | 10.5 | 9.0 |
| | Polymerization temperature | | °C | 60 | 60 | 60 | 60 | 60 | 60 |
| | Hydrogen content in gaseous phase mol% | | | 2.6 | 2.6 | 2.5 | 2.5 | 2.9 | 2.3 |
| Second vessel | Propylene | (feed) | kg/H | 4.8 | 4.9 | 0.6 | 3.7 | 4.4 | — |
| | Ethylene | (feed) | kg/H | — | — | 0.61 | — | — | — |
| | Heptane | (feed) | kg/H | 5.3 | 5.4 | 5.0 | 6.0 | 4.4 | 2.2 |
| | Polymerization pressure | | kg/cm²G | 7.0 | 7.0 | 2.3 | 6.0 | 9.2 | 4.9 |
| | Polymerization temperature | | °C | 62 | 62 | 52 | 60 | 60 | 60 |
| | Hydrogen content in gaseous phase mol% | | | 3.1 | 2.9 | 1.0 | 3.4 | 4.0 | 2.9 |
| Third vessel | Propylene | (feed) | kg/H | 1.5 | 1.5 | — | 1.3 | 2.0 | — |
| | Ethylene | (feed) | kg/H | — | — | — | 0.77 | — | — |
| | Heptane | (feed) | kg/H | 1.5 | 1.5 | — | 8.0 | 2.7 | — |
| | Polymerization pressure | | kg/cm²G | 5.5 | 5.5 | — | 4.3 | 7.6 | 3.0 |
| | Polymerization temperature | | °C | 60 | 60 | — | 52 | 60 | 60 |
| | Hydrogen content in gaseous phase mol% | | | 3.3 | 3.0 | — | 1.8 | 3.8 | 2.9 |
| Fourth vessel | Propylene | (feed) | kg/H | 0.3 | 0.3 | — | 0.5 | 0.4 | 1.7 |
| | Ethylene | (feed) | kg/H | 0.69 | 0.73 | — | 0.42 | 0.24 | 0.75 |
| | Heptane | (feed) | kg/H | 5.4 | 5.4 | — | 8.0 | 4.1 | 5.4 |
| | Polymerization pressure | | kg/cm²G | 3.6 | 3.7 | — | 2.8 | 6.3 | 3.5 |
| | Polymerization temperature | | °C | 53 | 52 | — | 52 | 54 | 52 |
| | Hydrogen content in gaseous phase mol% | | | 2.4 | 2.1 | — | 1.9 | 3.6 | 2.0 |
| Fifth vessel | Propylene | (feed) | kg/H | 1.7 | 1.9 | — | — | 0 | 1.9 |
| | Ethylene | (feed) | kg/H | 0.51 | 0.59 | — | — | 0.33 | 0.59 |
| | Heptane | (feed) | kg/H | 2.3 | 2.3 | — | — | 6.4 | 2.3 |
| | Polymerization pressure | | kg/cm²G | 3.5 | 3.9 | — | — | 4.9 | 3.7 |
| | Polymerization temperature | | °C | 52 | 52 | — | — | 53 | 52 |
| | Hydrogen content in gaseous phase mol% | | | 1.2 | 1.0 | — | — | 6.2 | 1.0 |
| Sixth vessel | Propylene | (feed) | kg/H | 0.3 | — | — | — | 0 | — |
| | Ethylene | (feed) | kg/H | 0.15 | — | — | — | 0.16 | — |
| | Heptane | (feed) | kg/H | 12.0 | — | — | — | 7.6 | — |
| | Polymerization pressure | | kg/cm²G | 2.3 | — | — | — | 3.6 | — |
| | Polymerization temperature | | °C | 53 | — | — | — | 52 | — |
| | Hydrogen content in gaseous phase mol% | | | 1.6 | — | — | — | 4.8 | — |
| | Yield of crystalline polymer | | kg/H | 17.4 | 16.8 | 5.5 | 12.3 | 11.4 | 17.0 |

Table 2

| Properties | | Example | | Reference Example | | | | |
|---|---|---|---|---|---|---|---|---|
| | | 1 | 2 | 1 | 2 | 3 | 4 | 5 |
| Melt index | (g/10min) | 2.9 | 3.1 | 2.8 | 3.2 | 2.6 | 2.9 | 3.2 |
| Ethylene content | (wt %) | 4.9 | 4.5 | 4.8 | 4.6 | 3.2 | 4.5 | 4.6 |
| Falling weight | at 20° C | 72 | 71 | 51 | 56 | 48 | 59 | 71 |
| Impact strength | at 0° C | 90 | 83 | 26 | 31 | 24 | 42 | 74 |
| (kg-cm) | at −20° C | 72 | 75 | 17 | 19 | 17 | 32 | 76 |
| Brittle point | (° C) | −24 | −25 | −17 | −25 | −18 | −24 | −25 |
| Stiffness | (kg/cm²) | 9,500 | 9,700 | 9,500 | 8,700 | 10,800 | 9,900 | 9,800 |

The physical properties were measured as follows:
Melt index: According to ASTM D 1238-62 T Ethylene content: According to infra-red absorption spectrum Falling weight impact strength (FWI): According to BS-2782-306 B Test piece, sheet of 1 mm in thickness, was tested on Du Pont Impact tester and the maximum energy at non-break was measured.

Brittle point: According to ASTM D 746

Stiffness: According to ASTM D 747-58 T

It is apparent from the results that the present invention provides ethylene-propylene block copolymers having the same excellent physical properties as those in the batch process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for the continuous production of crystalline ethylene-propylene block copolymers containing propylene as the major component in a slurry-phase by homopolymerizing propylene and then copolymerizing ethylene and propylene in the presence of an inert hydrocarbon solvent and a stereoregular polymerization catalyst in polymerization vessels connected in series, which comprises hompolymerizing propylene in three polymerization vessels, wherein the inner pressure of the vessels is decreased in order to make the inner-pressure difference between each consecutive two vessels from 1 to 3 kg/cm$^2$, and then copolymerizing ethylene and propylene in at least two polymerization vessels, the resulting slurry being transferred from one vessel to the next vessel by the inner-pressure difference between the vessels in the homopolymerization step and being pressure-transferred by means of a slurry pump to at least one vessel in the copolymerization step.

2. The method according to claim 1, wherein said inner-pressure difference between the homopolymerization vessels is 1.5 to 2.5 kg/cm$^2$.

3. The method according to claim 1, wherein the pressure in the first vessel is 11.5 to 5.5 kg/cm$^2$ (gauge).

4. The method according to claim 1, wherein the resulting slurry in the fourth vessel is pressure-transferred by means of a slurry pump to the fifth vessel.

5. The method according to claim 1, wherein the pressure in one vessel, to which the slurry is pressure-transferred by means of a slurry pump from the other vessel, is kept under a pressure of −0.5 to 5 kg/cm$^2$ higher than the pressure in the other vessel.

* * * * *